Figure 1:
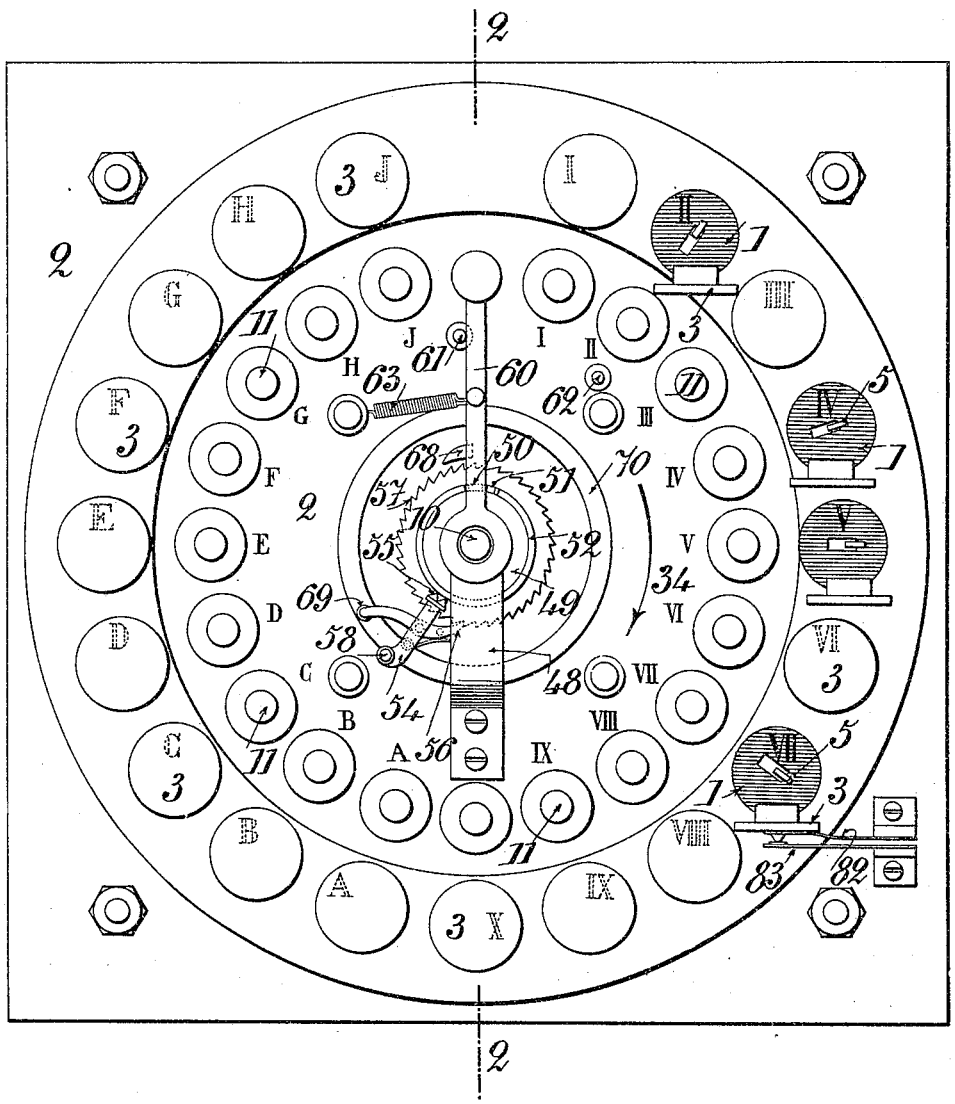

No. 784,388. PATENTED MAR. 7, 1905.
L. DESPRADELS.
APPARATUS FOR ELECTRICAL SIGNALING.
APPLICATION FILED NOV. 19, 1902.

6 SHEETS—SHEET 1.

WITNESSES
W. M. Avery
H. C. Davis

INVENTOR
Louis Despradels
BY
Munn & Co
ATTORNEYS.

No. 784,388. PATENTED MAR. 7, 1905.
L. DESPRADELS.
APPARATUS FOR ELECTRICAL SIGNALING.
APPLICATION FILED NOV. 19, 1902.

6 SHEETS—SHEET 4.

WITNESSES:
W. M. Avery
A. H. Davis

INVENTOR
Louis Despradels.
BY
ATTORNEYS.

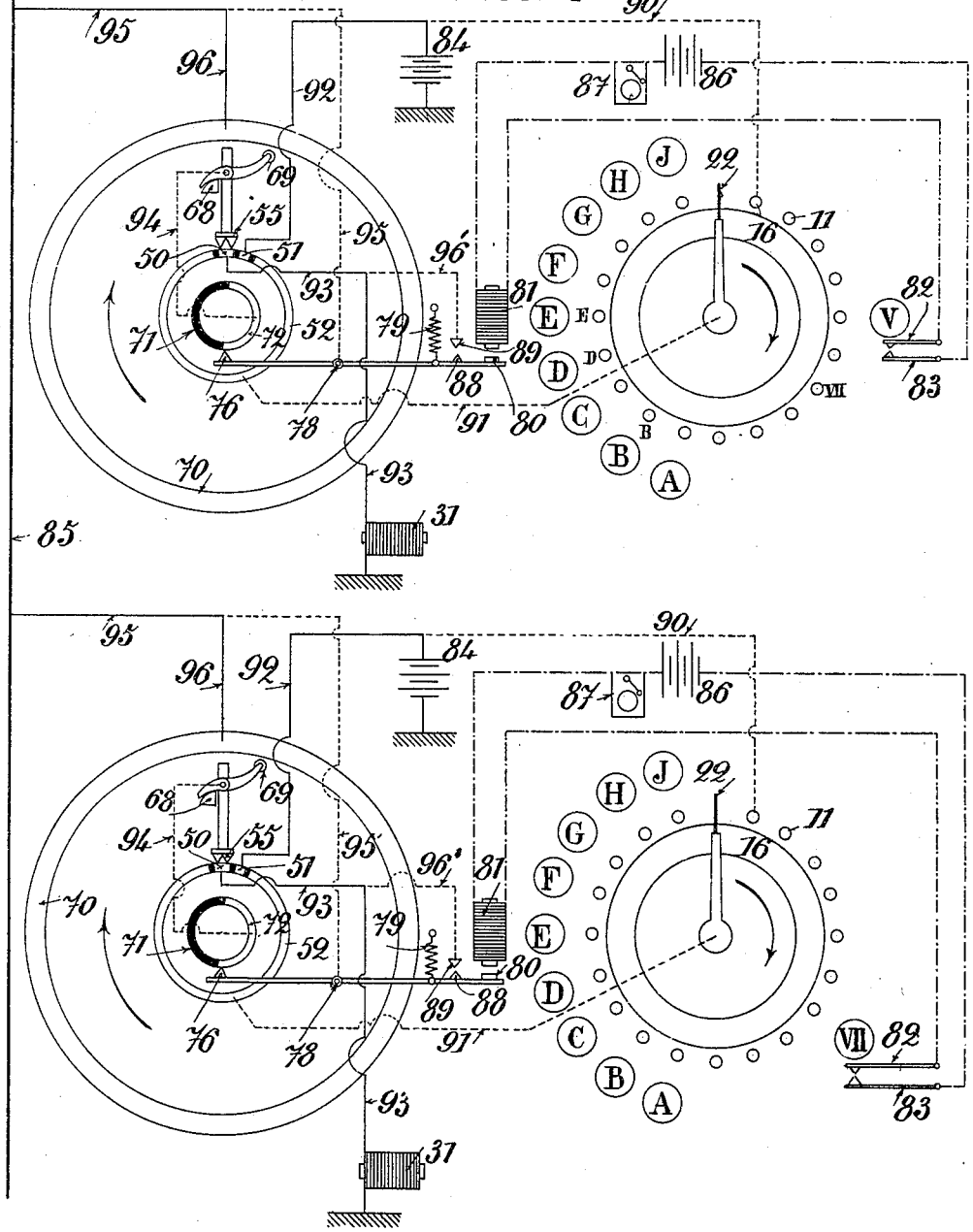

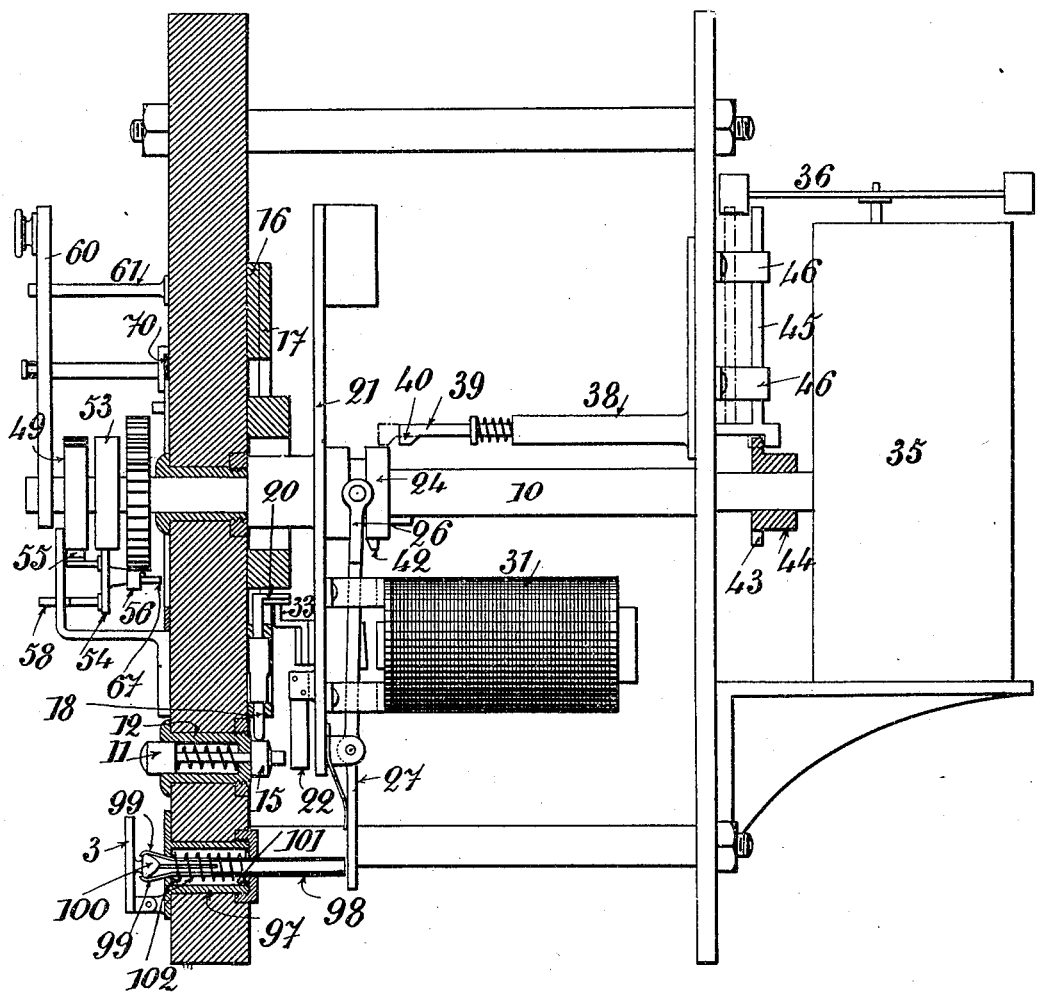

No. 784,388.

Patented March 7, 1905.

UNITED STATES PATENT OFFICE.

LOUIS DESPRADELS, OF PARIS, FRANCE.

APPARATUS FOR ELECTRICAL SIGNALING.

SPECIFICATION forming part of Letters Patent No. 784,388, dated March 7, 1905.

Application filed November 19, 1902. Serial No. 131,955.

*To all whom it may concern:*

Be it known that I, LOUIS DESPRADELS, engineer, a citizen of the Republic of France, residing at 20 Rue du Chateau d'Eau, Paris, in the Republic of France, have invented certain new and useful Improvements in Apparatus for Electrical Signaling, of which the following is a specification.

This invention relates to an apparatus for electrical signaling, and which is so arranged as to allow of obtaining by means of a simple and cheap construction an easy and ready transmission of signals between two or more stations at the same time.

The apparatus located at each station comprises a series of disks with shutters corresponding, respectively, to as many different signals, the meaning of which is agreed on beforehand. Beside each disk is located a button having a contact-piston and which normally projects forward of the apparatus, where it can be pushed inward by the finger of the attendant to prepare the transmission of the corresponding signal.

The apparatus comprises, moreover, a movable brush so operated by clockwork as to pass successively in front of all the contact-pistons in touching only those which have been pushed inward. The brush-carrier is provided with a movable lever arranged to act on the shutters of the disks in causing them to swing in passing in front of the same under the action of an electromagnet which controls the said lever. When the apparatus is at rest, the clockwork is locked by a stopping device placed under the control of the said electromagnet, so that when a first current passes into the latter the clockwork is unlocked and the brush-carrier is put in motion and passes in front of the whole series of contact-pistons and disks with shutters, after which the clockwork is again locked by the said stopping or locking device.

The apparatus in the several stations which are in communication with each other are similar and connected together by a common line. The clockworks of the same are so regulated that the stroke of the brush-carrier is the same everywhere—that is to say, the said brush-carriers will move synchronously when a first current passes through the line and the several electromagnets and unlocks simultaneously the several clockworks. With these arrangements and electrical connections suitably established in each apparatus between a local battery, the electromagnet, the contact-pistons, and the line and by means of a commutator controlled by the clockwork the following result is obtained: At the transmitting-station after any number of piston-buttons have been pushed inward and the commutator has been operated by hand to produce a first and momentary current through the electromagnet of the said station, the line, and the electromagnets of the other stations the brush-carriers of all the apparatus are put in motion synchronously. When the brush passes at the transmitting-station in contact with a piston pushed inward, a current is again sent into all the electromagnets connected to the line, and the levers, actuated by the said magnets, cause the shutters of the disks to swing simultaneously in passing in front of the same. The result is that a same signal has thus been shown in all the stations. The same operation takes place each time that the brush at the transmitting-station meets a piston pushed inward, so that during the full period of movement of the brush-carrier a less or greater part, or even, if required, the whole series, of signals can be thus transmitted.

This invention also comprises the combination, with an apparatus of the specified kind, of selecting means whereby each station is enabled to communicate with another station or with any of several other stations among those which are connected to the same line. Each apparatus thus plays at the same time the parts of a transmitter, of a receiver, and of a commutator or selector. The said selecting means consist in using a part of the piston-buttons and the corresponding disks for designating the several stations to be called and the remainder of the series of buttons for designating orders to be transmitted. Moreover, in the apparatus of any determined station the shutter of the disk of which the number corresponds to the number of the station is combined with a switch which it closes in swinging, the said switch being placed in a bell-ringing circuit. The result is that a station cannot be called unless the disk shutter bearing the respective number be actuated by the line-current.

This invention comprises, finally, a means for preventing any disk shutter from being actuated in the several stations with which any transmitting-station must not communicate. This result is obtained by doing away with in each apparatus the levers and shutters corresponding to the numbers of the stations, save a single calling-shutter and corresponding to the number of the respective station, and by using a commutating device actuated by an electromagnet into which a current is only sent when the calling-shutter of the said apparatus has been swung, the said electromagnet being placed in the same circuit as the ringing bell. By this means in the apparatus which are to be put in communication with each other the communicating devices are actuated and allow the passage of currents from the line during the passage of the brush-carrier in front of the pistons corresponding to the signals to cause the corresponding shutters to swing, whereas in the other apparatus which are to remain inactive the commutating devices prevent the passage of the said currents from the line.

Having thus described the construction and operation of the apparatus as to the essential points, I will now show in detail one form in which the invention can be carried out, as well as modified forms of several parts.

Figure 2:
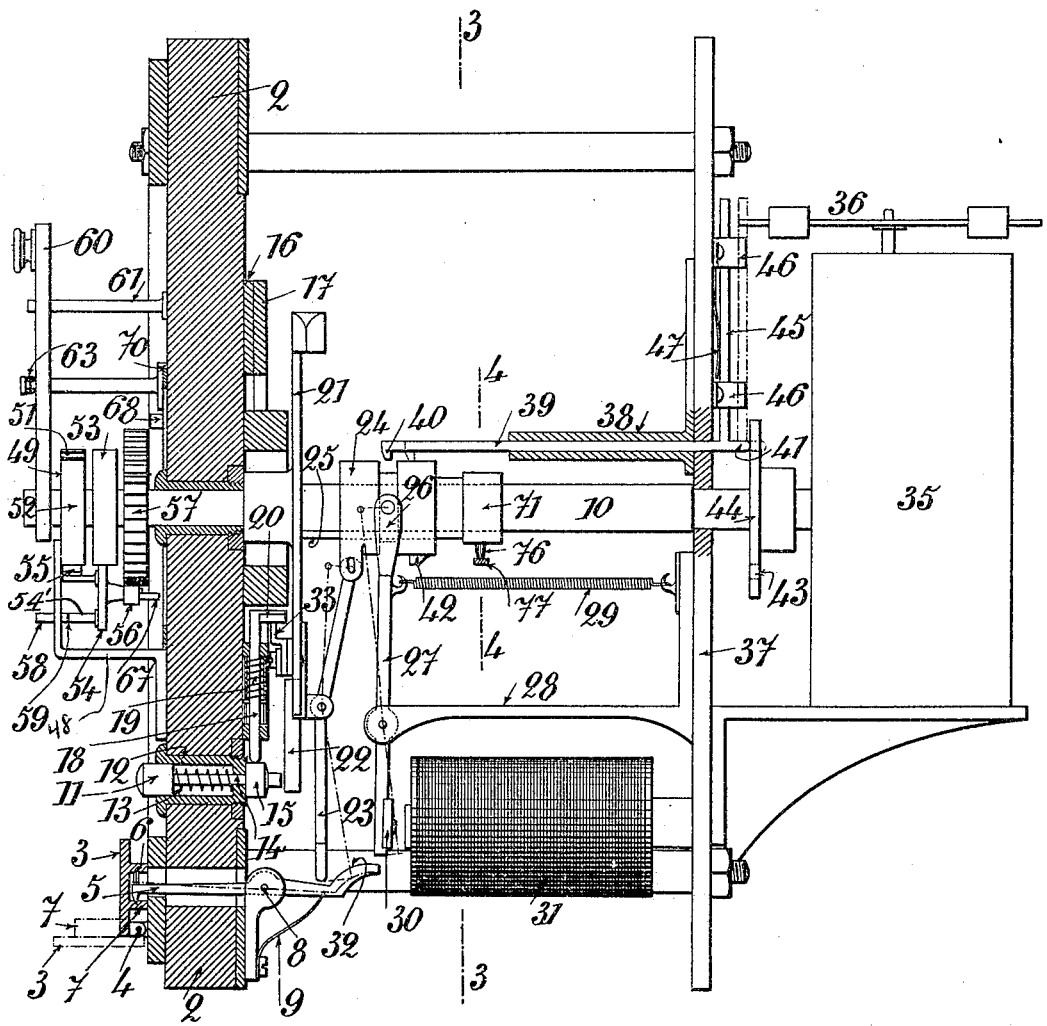
Figure 3:
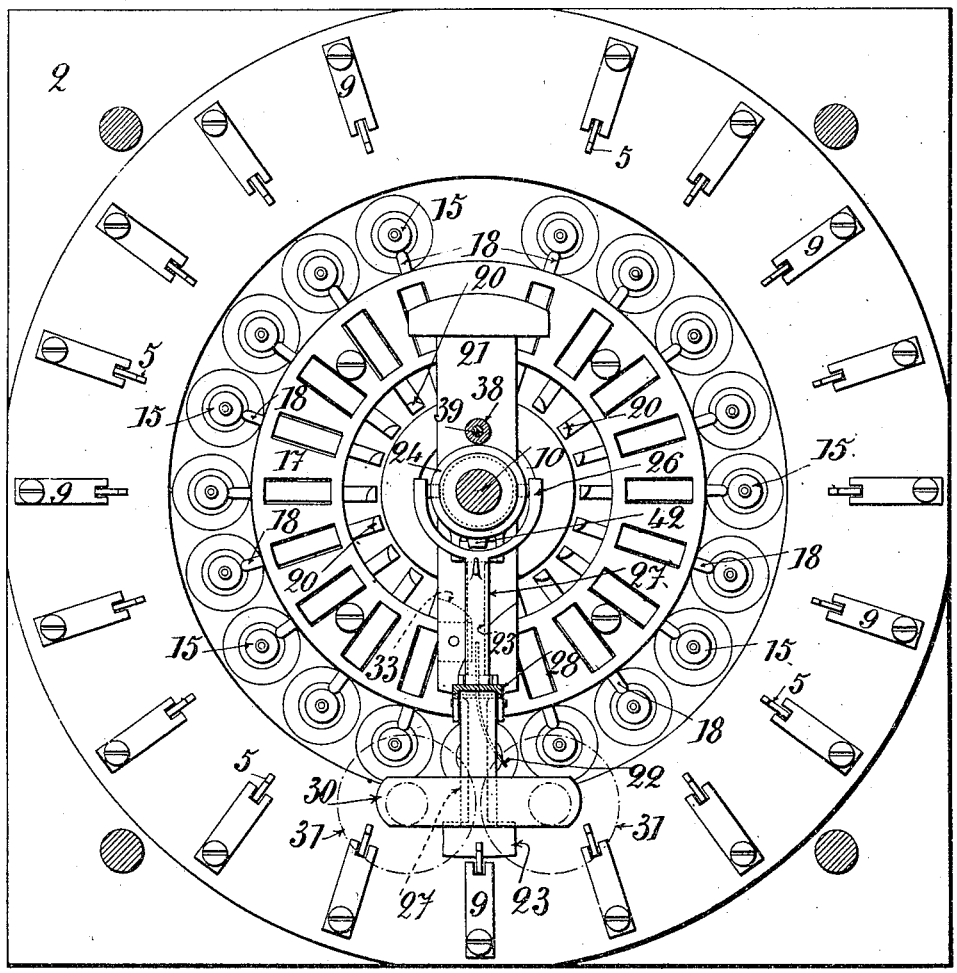
Figure 4:
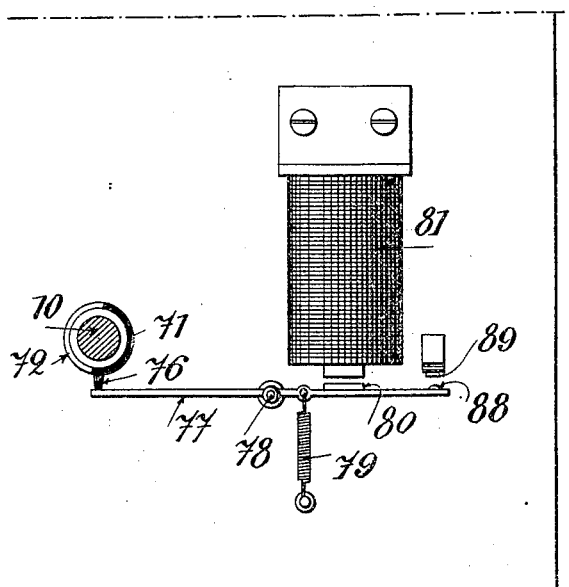
Figure 5:
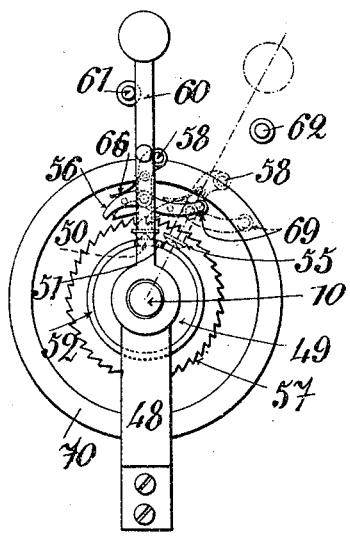
Figure 6:
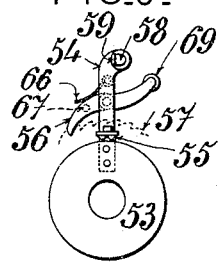
Figure 8:
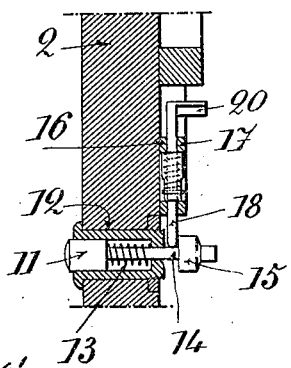
Figure 9:
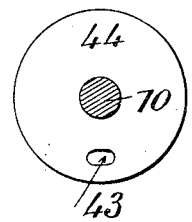
Figure 7:
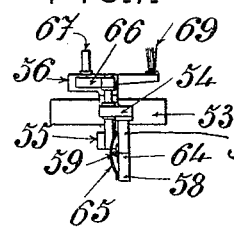

In the accompanying drawings, Figure 1 is a front elevation of an apparatus in a position to operate. Fig. 2 is a vertical section on the line 2 2 of Fig. 1. Fig. 3 is a vertical section on the line 3 3 of Fig. 2. Fig. 4 is a partial vertical section on the line 4 4 of Fig. 2. Fig. 5 is a detail view of the calling-commutator in the position of rest. Figs. 6 and 7 show in elevation and in plan, respectively, a brush-carrying arm forming a part of the said commutator. Fig. 8 is a partial vertical section on the line 2 2 of Fig. 1, showing a bolt in locking position. Fig. 9 is a front view of a disk fixed on the driving-shaft. Fig. 10 is a diagram of the electrical connections of the apparatus, and Fig. 11 is a vertical section of a modified form of the apparatus.

The apparatus shown in Figs. 1 to 10, inclusively, comprises a series of disks 1, circularly arranged on a vertical plate 2, of insulating matter, and each bearing a suitable distinctive sign. Each disk is provided with a shutter 3, mounted on a hinge 4, located at the lower part of the shutter. The shutter 3 is so arranged that its center of gravity is in front of the hinge 4 and that the said shutter has a tendency to swing by its own weight. It is held in a vertical position by means of a catch 5, of which the nib takes into a circular groove 6, formed at the inside of a flange 7 of the shutter. The said catch is pivoted at 8 on the plate 2, and its tail, which projects from the plate behind, is pressed by a spring 9, so fixed to the said plate as to hold the nib of the catch engaged in the groove 6. The several catches 5 are so arranged as to oscillate in radial planes, and they all lie at the same distance from a horizontal shaft 10 passing through the center of the series of disks. In the plate 2 and beside the disks are arranged a series of buttons 11, slidable within fixed sockets 12 and pressed forward by springs 13. On each button is fixed a rod 14, carrying a ring 15 on its end, which projects from the plate 2 behind. Behind the said plate is fixed a disk 16, on which is fixed another disk, 17, and between the said disks are slidable a series of bolts 18. Each bolt is solicited by a spring 19 to move out of the disk, so as to become yieldingly engaged with the corresponding ring 15. When the button 11 is pushed inward, as shown in Fig. 8, the ring 15 releases the bolt 18 behind itself and cannot move back again, so that the button remains pushed inward. The bolt 18 carries also at its inner end a square heel 20 for a purpose to be hereinafter described. On the shaft 10 is fixed a brush-carrying arm 21, on which is fixed a flexible brush 22, so arranged as to be able to meet the ends of the rods 14 which have been pushed inward without touching the rods 14 remaining at rest. On the said arm 21 is pivoted a lever 23 so as to oscillate in the movable plane formed by the said arm and the shaft 10. The inner end of the said lever is pivoted to a grooved sleeve 24, slidable on a part of the shaft 10, which is provided with a long key 25. In the groove of the said sleeve 24 is engaged the bifurcated end 26 of a lever 27, pivoted to a fixed support 28. On the said lever constantly acts a spring 29 to move the sleeve 24 away from the arm 21. On the other hand, the lever 27 carries an armature 30 of soft iron, placed in front of an electromagnet 31, fixed to the frame 37 of the apparatus, so that the attraction of the electromagnet draws the sleeve 24 nearer the arm 21. The outer end of the lever 23 is arranged inward of the series of the tails of the catches 5 and so as to be able to pass freely in front of the said tails without touching the same when the sleeve 24, connected to the lever 23, is moved away from the arm 21. (See Fig. 2.) The tail of each catch 5 has an inclined plane 32, so that when the sleeve 24 is drawn toward the arm 21 the lever 23 oscillates and strikes the inclined plane 32 in moving upward the tail of the catch, and consequently in moving the nib of the catch out of the groove 6 of the corresponding shutter 3, so that the latter swings by its own weight, as shown in Figs. 1 and 2. On the arm 21 is also fixed a cam 33, located outside the circular series of heels 20 of the bolts. When the arm 21 turns, the cam 33 acts successively on all the heels 20 and brings back toward the center all those which had moved away from the said center in thus moving the head of the bolts 18 away from behind the rings 15, and consequently in allowing the rods 14 and the buttons 11 to come forward again under the action of the respective springs 13.

The shaft 10 is actuated in the direction of the arrow 34 by means of any usual system of clockwork 35, of which the casing and a balance 36, controlling the escapement of the mechanism, are shown in the drawings.

On the frame of the apparatus is fixed a tube 38, in which slides a rod 39, having a heel 40 in front and a point 41 at its opposite end. The heel 40 lies above the sleeve 24 and can be actuated by a projection 42, formed on the sleeve, when the latter is moved forward. The part 41 is able to take into a hole 43, made in a disk 44, fixed to the shaft 10, when the said disk comes into its position of rest. The rod 39 also carries a vertical arm 45, guided in slideways 46 and which can place itself in the path of the oscillating balance 36, so as to stop the said balance when the rod 39 moves backward in engaging its point in the hole 43. When the rod 39 is moved forward, as shown in Fig. 2, the balance 36 is free to oscillate. A spring 47, acting on the arm 45, tends to engage the said arm on the balance and to push the point 41 into the hole 43 when the latter comes opposite the said point. The apparatus also comprises a commutating device located in front of the plate 2. On a support 48, fixed to the plate 2, is fixed a disk 49, at the center of which passes freely the end of the shaft 10, and the said disk of insulating matter carries three metal segments 50, 51, and 52, insulated one from the other. On the shaft 10 is loosely mounted another disk carrying an arm 54, and the said arm is provided with a brush 55, which rubs on the segments 50 51 52. The said arm 54 carries also a pawl 56, which engages the teeth of ratchet-wheel 57, fixed to the shaft 10. Finally, the arm 54 is provided with a pin 58, pivoted at 59 and on which can act a lever 60, loosely mounted on the end of the shaft 10, all as indicated in Figs. 5, 6, and 7. The said lever 60 can oscillate between two stop-pins 61 and 62, fixed to the plate 2, and it is held at rest against the pin 61 by a spring 63.

The pawl 56 is pressed by a spring 66, which tends to keep it on the wheel 57. The said pawl is provided with a pin 67, which projects laterally and can meet with an inclined plane 68, fixed to the plate 2, so that the said pin is moved away from the ratchet-wheel 57 when it slides on the inclined plane. Finally, the pawl 56 carries a brush 69, so arranged as to rub against a metal crown 70, fixed to the plate 2, when the pawl is engaged on the wheel 57. When the said pawl is moved up by the inclined plane 68, the brush 69 comes inward of the crown 70 and ceases to touch the same.

On the shaft 10 is fixed a ring 71, of insulating matter, surrounded on one-half of its periphery by a metal segment 72. On the said ring 71 can rub a brush 76, mounted on a lever 77, which oscillates on the frame of the apparatus at 78 and is subjected to the action of a spring 79 tending to bring the brush onto the ring 71. The lever 77 carries also the movable armature 80 of a fixed electromagnet 81, so that the attraction of the said electromagnet tends to move the brush 76 away from the ring 71. Moreover, the lever 77 is provided with a contact-piece 88, which is normally held away from another contact-piece, 89, but which comes against the latter when the electromagnet 81 draws the lever 77.

In the apparatus shown nineteen piston-buttons 11 are represented, ten of which correspond to the order-numbers of the several stations connected with one and the same line, the said stations being designated by the figures I to X. The other nine buttons correspond to orders represented by the letters A to J. The buttons J and I are separated one from the other by an empty interval twice as large as the interval between the other buttons. The disks 1 bear the same indications as the corresponding buttons.

The apparatus shown is represented as being connected to the station VII. Under the shutter of the disk marked VII is located a switch comprising two contact-pieces 82 and 83, fixed to the plate 2 and so arranged as to normally keep away the one from the other and to be brought together by the weight of the shutter 3 falling onto the piece 82. However, it is essential to state that the apparatus of the station VII only comprises the disk with the shutter marked VII, as well as the disks having the shutters marked A to J, the other disks, having the shutters marked I to VI and from VIII to IX, being done away with. At the station V, for instance, the disks having the shutters marked I to IV and VI to IX will be done away with, and the switch 82 83 will be located on the shutter V. It will be the same in the other stations according to their order-numbers. Fig. 1 is therefore a theoretical figure which would be the result of the superposition of all the dials.

The electrical connections between the several apparatus are established as shown in Fig. 10, where only two stations are represented—those V and VII, for example. At the station V a battery 84 has its positive pole connected to the disk 16 by a wire 90 and its negative pole connected to the earth. Through the medium of the bolts 18 (not shown in Fig. 10) the buttons 11 are constantly in communication with the positive pole of the battery 84. The brush 22 is connected to the segment 52 of the commutator by a wire 91. The segment 51 is connected directly to the positive pole of the battery 84 by a wire 92. The segment 50 is connected directly by a wire 93 to a pole of the electromagnet 31, the other pole of which is connected to the earth. The brush 55 is connected by a wire 94 to the metal segment 72, and the brush 76, which rubs on the said segment, is connected to the line 85 by a wire 95. The brush 55 is also connected to the brush 69, and the crown 70 is connected to the line 85 by wires 96 and 95. The contact 88 is connected to the brush 76 and to the wire 95, and the contact 89 is connected to the wire 93 by a wire 96'. The switch 82 83 is mounted in circuit with the electromagnet 81, a ringing bell 87, and a battery 86. At the station VII the plant is the same, and the parts are designated by the same signs of reference. However, the switch 82 83, as well as the corresponding shutter-disk, are located opposite the button VII instead of opposite the button V.

The operation is as follows: In the position of rest of the apparatus the clockwork of each of the same is stopped by the arm 45 of the rod 39 and the brush-carrier 21 is in the vertical position, the brush 22 lying between the buttons J and I, the brush 55 on the segment 50, the brush 69 out of contact with the crown 70, and the brush 76 on the segment 72. The shutters 3 are all up and the buttons 11 all outward. No current then passes in the apparatus. When the attendant of the station V wants to communicate with the station VII and transmit to it, for instance, the orders B D E, he pushes inward the buttons VII B D E and then takes hold of the lever 60 and brings it into the position shown in dotted lines in Fig. 5 and allows the same to return to rest under the action of the spring 63. During the movement of the lever 60 the arm 54 is carried forward by its pin 58 and moves, by means of the latter, the pawl 56 and the brush 69. The pawl ceases being moved up by the inclined plane 68 and rides on the teeth of the ratchet-wheel 57 and then becomes engaged between two teeth of the said wheel when the lever 60 is released. During this movement of the arm 54 at the station V the brush 55 has put in communication for a moment the segments 50 and 51, so that the battery 84 has sent through 92 a current from 50 to 51 and thence through 93 and the electromagnet 31. The said electromagnet acting on the armature of the lever 27 moves the sleeve 24 toward the arm 21. The result is that the projection 42, which when at rest lies opposite the heel 40 of the rod 39, carries the said rod forward, and thus moves the arm 45 away from the balance 36 in thus allowing the said balance to be immediately put in motion through the action of the clockwork. At the same time the brush 69 has been put in contact with the crown 70. The result is that the battery 84 of the station V sends by wire 92 a current through the segment 51, the brush 55, the brush 69, the wires 96 95, and the line 85. The said current is received in all the stations connected to the line 85—for instance, at the station VIII—in passing through the wire 95, the brush 76, the segment 72, the wire 94, the brush 55, which is at rest, the wire 93, and the electromagnet 31. Consequently in each station the electromagnet 31 is magnetized, and thus produces the unlocking of the clockwork 35, so that the brushes 22 of the several stations are about to move synchronically. In no station does there yet pass a current into the electromagnet 81, because the two parts 82 83 of the switch remain open. From the moment when the brush 55 of the station V has passed the segment 51 there no longer passes any current in the line 85 up to the moment when the brush 22 meets the first of the piston-buttons 11 pushed forward. In the present case when the brush 22 passes on the button marked VII the battery 84 sends a current through the wire 90, the disk 16, the button marked VII, the brush 22, the wire 91, the segment 52, the brush 55, the brush 69, the crown 70, the wires 96 and 95, and the line 85. The said current is received in the apparatus of all the other stations in passing, for instance, to the station VII through the wire 95, the brush 76, the segment 72, the wire 94, the brush 55, the segment 50, and the electromagnet 31, as hereinbefore described. Consequently the electromagnet 31 of all the stations save station V actuate at the same time the levers 27 and cause the sleeves 24 to move forward toward the respective arms 21 in thus causing the levers 23 to oscillate when passing in front of the corresponding catches to the button VII. The result is that at the station VII the shutter 3 of the disk marked VII is unlocked and falls horizontally in closing the switch 82 83. The current of the battery 86 of the said station then passes at the same time through 82 83, magnetizes the electromagnet 81, and rings the bell 87. The lever 77, actuated by the electromagnet 81, moves the brush 76 away from the segment 72 and puts in contact the pieces 88 and 89. In the other stations where the shutter VII does not exist the switch 82 83 is not closed and the electromagnet 81 is not magnetized. The brush 76 is held on the segment 72 by the action of the spring 79. After the brush 22 has passed beyond the button VII the current passing into the electromagnet 31 of each station is cut off, and the respective spring 29 brings the sleeve 24 backward. The brush 22 of the station V can also meet successively several buttons from I to X and cause the fall of the calling-shutters of the corresponding stations, whereas the shutters of the other stations do not fall. In all the stations called, as in the station VII, the electromagnet 81 will consequently be magnetized and will hold the pieces 88 and 89 in contact even after the segment 72 will have passed the brush 76, whereas in the stations which are not called the current cannot pass any longer through the wire 95, the brush 76, the segment 72, the wire 94, the brush 55, the segment 50, the wire 93, and the electromagnet 31 after the segment 72 will have turned sufficiently to pass the brush 76, and as the electromagnet 81 will not have been magnetized to close the switch 88 89 the current cannot reach the electromagnet 31 through the wire 95, the switch 88 89, and the wire 93. The electromagnet 31 is thus put out of circuit in the stations which are not called. The end of the segment 72 passes the brush 76 at the time when the brush 22 is passing from the button X to the button A, so that when the brush 22 passes later on onto the buttons pushed inward, B D E, the currents emitted successively by the station V through 84 90 22 91 52 55 69 70 96 95 and the line 85 will be received exclusively in the stations called—for instance, at the station VII—in passing through 95, 88, 89, 96', 93, and 31. The shutters of the disks B D E of the station VII will thus be swung by the action of the electromagnet 31 of that station. During the rotation of the shaft 10 of each station the disk 44, fixed on the said shaft, presents its solid part in front of the rod 39, so that the said rod cannot move backward under the action of the spring 47 and stop the motion of the balance 36 by means of the arm 45; but when the shaft 10 has made a full revolution the cut-out part 43 again comes in front of the rod 39 and allows the latter to move back, and thus stop the clockwork. All the apparatus connected to the line consequently cease simultaneously to operate. However, the bell 87 continues to ring in all the stations called until the fallen calling-shutters are put up again by hand, whereby they again become locked on the nibs of the catches 5. Again, during the rotation of the brush-carrier 21 with the shaft 10 the bolts 18 of the station V are successively pushed toward the center by the cam 33 and leave the buttons 11, which had been pushed forward. The apparatus is then ready to transmit and receive fresh signals.

The apparatus hereinbefore described is a complete apparatus—that is to say, it serves both as a commutator or selector and as an apparatus for establishing a correspondence; but it is evident that without departing from the present invention one can so modify the apparatus that it may serve only in the one or other way. To obtain a simple commutating apparatus, all that need be done is to do away with the disks having the shutters marked from A to J, as well as the corresponding catches 5. On the contrary, to obtain a simple apparatus for establishing a correspondence one must use as many disks 1, shutters 3, and catches 5 as there are piston-buttons 11. There may, moreover, be any number of piston-buttons. Such of the details of construction as are not essential may also be modified. For instance, one can, as shown in Fig. 11, arrange the electromagnet 31, which actuates the shutters 3, not as a fixture on the frame of the apparatus, but on the rotary arm 21 in such a manner that it acts directly on the lever 27 to unlock the shutters. Again, instead of using catches to hold up the shutters 3 one may arrange in fixed sockets 97 movable tubes 98, the forward end of which is split so as to form several yielding claws 99, which can open out and become engaged on a head 100, formed on the shutter 3 when the said claws are brought and pressed together by the forward edge of the socket 97. The tubes 98 are each provided with a ring 101, on which acts a spring 102, which constantly pushes the tube 98 inward to press the claws together on the head 100. The outer end of each tube 98 lies near the path followed by the lever 27, so that when a current passes into the electromagnet 31 the lever 27 is attracted and pushes the tube 98 outward in thus causing the claws 99 to open out and leave hold of the head 100 and allow the shutter 3 to fall forward. The modifications in no way change the operation of the apparatus described in reference to Figs. 1 to 10.

The apparatus which forms the object of the present invention can be used for signaling by wire, as an ordinary telegraphic apparatus, as an apparatus for signaling for railways, as a fire-alarm, as a commutator for electrical bolting, (the locking of doors, the explosion of mines, &c.,) as a calling apparatus, a commutator or alarm in a telegraph or telephone station when several stations are connected to one and the same wire, as a registering gyrometer, as a round-controller, and the like. It can also be used for signaling without a wire as a calling apparatus or commutator in being introduced with a Morse telegraph into the circuit of the Branly tube.

I claim—

1. In an apparatus for electrical signaling, the combination of a support, a circular series of buttons connected therewith and provided with contact-pistons which can be pushed inwardly, swinging shutters disposed adjacent to said buttons, an arm mounted in front of the series of contact-pistons and free to turn, a lever mounted upon said arm and turning therewith for the purpose of causing said shutters to swing, and an electromagnet for actuating said lever.

2. In an apparatus for electric signaling, the combination of a support, a circular series of buttons connected therewith and provided with contact-pistons which can be pushed inward, a spring for pushing each piston outward, a bolt capable of locking the button when it is pushed inward, and of a spring pushing the bolt toward its position for locking the button, an arm turning in front of the series of contact-pistons, and means on the said arm for opening the bolts successively in passing in front of the same.

3. In an apparatus for electrical signaling, the combination of a circular series of buttons having contact-pistons which can be pushed inward, of a spring pushing each button outward, of a bolt for locking the said button when it is pushed inward, of a spring acting on the bolt, of a heel formed on the bolt, of an arm turning in front of the series of contact-pistons, of means for turning the arm and of a cam on the said arm acting on the heels of the bolts to unlock the piston-buttons.

4. In an apparatus for electric signaling, the combination of a series of swinging shutters, a support provided with a series of buttons, said buttons being disposed circularly, a shaft disposed in the center of said series of buttons, a clockwork connected to the said shaft, of an arm fixed to the shaft, of a lever mounted on the said arm and turning with the same, of an electromagnet actuating the said lever, of means whereby the lever causes the shutters to swing when it is actuated, of a slidable rod, of an arm on the said rod to lock the clockwork, of a spring pushing the rod toward the locking position, of a disk fixed to the shaft to hold the rod in the unlocking position, and of an opening in the said disk to allow the rod to move after each complete revolution of the shaft.

5. In an apparatus for electric signaling, the combination of a series of swinging shutters, a support provided with a series of buttons, a shaft disposed adjacent to said series of buttons, a clockwork connected to the said shaft, of an arm fixed to the shaft, of a lever mounted on the said arm and turning with the same, of an electromagnet actuating the said lever, of means whereby the lever causes the shutters to swing when it is actuated, of a slidable rod, of an arm on the said rod to lock the clockwork, of a spring pushing the rod toward the locking position, of a disk fixed to the shaft to hold the rod in the unlocking position, of an opening in the said disk to allow the rod to move after each complete revolution of the shaft, of a heel on the said rod, of a slidable sleeve on the shaft and which is actuated by the said electromagnet, and of a projection on the said sleeve to act on the said heel.

6. In an apparatus for electrical signaling, the combination of a circular series of buttons having contact-pistons, of a support for the series of buttons, of the swinging shutters, of a rotary shaft, of an arm on the said shaft, of an electromagnet, of means carried by the said arm to cause the said shutters to swing successively under the action of the said electromagnet, of a switch arranged to be closed by one of the said shutters, the rank of which corresponds to the order-number of the station on the line, of a battery and of a ringing bell in circuit with the said switch.

7. In an apparatus for electrical signaling, the combination of a circular series of buttons having contact-pistons, of a support for the series of buttons, of swinging shutters, of a rotary shaft, of an arm on the said shaft, of an electromagnet, of means carried on the said arm and whereby the said shutters are caused to swing under the action of the said electromagnet, of a switch arranged to be closed by the said shutters, the rank of which corresponds to the order-number of the station on the line, of a battery and bell in circuit with the said switch, of a second electromagnet and bell in circuit with the said switch, of a lever actuated by the said electromagnet, of a brush on the said lever, of a commutator-segment mounted on the shaft to be rubbed by the said brush, and of a second switch arranged to be closed by the said lever when it is attracted by the respective electromagnet, the result being that the first-named electromagnet is held in the line-circuit during the contact of the said segment with the brush, and that the passage of the line-current through the said electromagnet is afterward allowed or prevented according to whether the second switch is closed by the action of the second electromagnet or remains open for the purpose set forth.

8. In an operating device for an electrically-controlled mechanism, the combination with a base and frame, of a plurality of keys, a corresponding number of electric circuit-terminals, arms adapted to revolve within said frame, means for retaining any of said keys in a depressed position, means for closing the circuit through the terminal corresponding to the depressed key, means for releasing the key, and means for opening the circuit across said terminal.

9. In an operating device for an electrically-controlled mechanism, the combination with a base and frame, of a plurality of keys, a corresponding number of electric circuit-terminals, arms adapted to revolve within said frame, means for retaining any of said keys in a depressed position, means for releasing a depressed key, means for returning a depressed key to its original position after being released, means for closing the circuit through the terminal corresponding to a depressed key, and means for opening the circuit through the said terminal.

In testimony that I claim the foregoing as my invention I have signed my name in presence of two subscribing witnesses.

LOUIS DESPRADELS.

Witnesses:
EDWARD P. MACLEAN,
EDMOND BLÉTRY.